United States Patent
Shoemaker et al.

(10) Patent No.: US 12,247,617 B2
(45) Date of Patent: Mar. 11, 2025

(54) CAVITATION RESISTANT JOURNAL BEARING

(71) Applicant: Hamilton Sundstrand Corporation, Charlotte, NC (US)

(72) Inventors: Mark W. Shoemaker, Pecatonica, IL (US); Ryan Shook, Loves Park, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 124 days.

(21) Appl. No.: 18/077,837

(22) Filed: Dec. 8, 2022

(65) Prior Publication Data

US 2024/0191752 A1 Jun. 13, 2024

(51) Int. Cl.
*F16C 33/12* (2006.01)
*F04C 2/18* (2006.01)

(52) U.S. Cl.
CPC .............. *F16C 33/121* (2013.01); *F04C 2/18* (2013.01); *F04C 2240/54* (2013.01); *F04C 2240/56* (2013.01); *F16C 2360/00* (2013.01)

(58) Field of Classification Search
CPC .... F16C 33/121; F16C 2360/00; F16C 17/02; F16C 17/107; F04C 2240/54; F04C 2240/56
See application file for complete search history.

(56) References Cited

U.S. PATENT DOCUMENTS

| | | | |
|---|---|---|---|
| 4,082,379 A | 4/1978 | Swearingen |
| 4,523,365 A | 6/1985 | Richmond |
| 4,573,889 A | 3/1986 | Lane |
| 5,288,457 A | 2/1994 | Boegel |
| 5,413,756 A | 5/1995 | Sahu |
| 5,951,171 A | 9/1999 | Blume et al. |
| 6,213,745 B1 | 4/2001 | Woodcock et al. |
| 6,491,436 B1 | 12/2002 | Yamada et al. |
| 6,716,010 B2 | 4/2004 | Eaton et al. |
| 7,281,853 B2 | 10/2007 | Duong |
| 7,435,003 B2 | 10/2008 | Nakamura et al. |
| 7,607,906 B2 | 10/2009 | Yates et al. |

(Continued)

FOREIGN PATENT DOCUMENTS

| | | |
|---|---|---|
| EP | 1722103 B1 | 2/2011 |
| EP | 2554859 B1 | 3/2017 |

(Continued)

OTHER PUBLICATIONS https://www.copper.org/applications/indistrial/bronze-bearing.php#design, accessed Oct. 26, 2022, 12 pages.

(Continued)

*Primary Examiner* — James Pilkington
*Assistant Examiner* — Aimee Tran Nguyen
(74) *Attorney, Agent, or Firm* — Kinney & Lange, P. A.

(57) ABSTRACT

A journal bearing for a gear driven pump includes a bearing body having a bearing body circular opening that defines a bearing surface along a length of the bearing body and a face plate adjacent to the bearing surface. The bearing surface is configured to carry a gear shaft load through a hydrodynamic fluid film pressure between a load surface of a gear shaft and the bearing surface. The bearing surface is formed from a leaded bronze material and the face plate is formed from a copper-nickel alloy.

20 Claims, 6 Drawing Sheets

(56) References Cited

U.S. PATENT DOCUMENTS

| | | |
|---|---|---|
| 8,845,199 B2 | 9/2014 | Haedicke et al. |
| 8,876,385 B2 | 11/2014 | Harada et al. |
| 8,979,377 B2 | 3/2015 | Chen et al. |
| 8,998,496 B2 | 4/2015 | Alexander et al. |
| 9,140,302 B2 | 9/2015 | Kane |
| 9,154,012 B2 | 10/2015 | Hori et al. |
| 9,194,427 B2 | 11/2015 | Kumagai et al. |
| 9,353,790 B2 | 5/2016 | Komatsubara et al. |
| 9,574,606 B2 | 2/2017 | Benco et al. |
| 9,677,559 B2 | 6/2017 | Ni et al. |
| 9,726,221 B2 | 8/2017 | Kovach et al. |
| 9,759,094 B2 | 9/2017 | Hutto |
| 9,810,231 B2 | 11/2017 | Daguin et al. |
| 9,856,914 B2 | 1/2018 | Kane |
| 9,874,208 B2 | 1/2018 | Veilleux et al. |
| 9,890,813 B2 | 2/2018 | Kovach et al. |
| 10,125,818 B2 | 11/2018 | Burkinshaw et al. |
| 10,180,159 B2 | 1/2019 | Meusel et al. |
| 10,294,985 B2 | 5/2019 | Yates |
| 10,323,688 B2 | 6/2019 | Tanaka et al. |
| 10,330,145 B2 | 6/2019 | Yates |
| 10,436,249 B2 | 10/2019 | Hoelzl |
| 10,480,569 B2 | 11/2019 | Merg et al. |
| 10,495,141 B2 | 12/2019 | Wilson et al. |
| 10,520,026 B2 | 12/2019 | Uneura |
| 10,578,160 B2 | 3/2020 | Masters |
| 10,584,747 B1 | 3/2020 | Goy et al. |
| 10,801,543 B2 | 10/2020 | Ammann et al. |
| 10,858,939 B2 | 12/2020 | Goy et al. |
| 10,858,940 B1 | 12/2020 | Le Duc et al. |
| 10,890,211 B2 | 1/2021 | Bennett |
| 10,941,767 B2 | 3/2021 | Veilleux et al. |
| 10,962,059 B2 | 3/2021 | Le Duc et al. |
| 11,060,559 B2 | 7/2021 | Snively et al. |
| 11,060,560 B2 | 7/2021 | Clements |
| 2002/0080840 A1* | 6/2002 | Morton ............... G03F 7/70025 372/57 |
| 2002/0122722 A1 | 9/2002 | Bertin et al. |
| 2003/0206670 A1 | 11/2003 | Maruyama et al. |
| 2007/0264148 A1 | 11/2007 | Yates et al. |
| 2008/0212906 A1 | 9/2008 | Kurimura et al. |
| 2008/0240968 A1 | 10/2008 | Chiu |
| 2009/0116773 A1* | 5/2009 | Kobayashi ............. F16C 33/14 384/279 |
| 2009/0208357 A1 | 8/2009 | Garrett |
| 2012/0068565 A1 | 3/2012 | Pfeil et al. |
| 2015/0016760 A1 | 1/2015 | Tanaka et al. |
| 2015/0184541 A1 | 7/2015 | Iizuka et al. |
| 2016/0084307 A1 | 3/2016 | Bennett |
| 2016/0265590 A1 | 9/2016 | Sano |
| 2018/0051742 A1* | 2/2018 | Yates ..................... F02C 7/22 |
| 2018/0051743 A1* | 2/2018 | Yates ..................... F04C 2/14 |
| 2018/0100504 A1 | 4/2018 | Yates |
| 2019/0032718 A1 | 1/2019 | Shinohara et al. |
| 2019/0301451 A1* | 10/2019 | Veilleux, Jr. .......... F16C 17/246 |
| 2019/0376557 A1* | 12/2019 | Snively .................. F16C 17/02 |
| 2020/0024947 A1 | 1/2020 | Goy et al. |
| 2020/0025195 A1* | 1/2020 | Poteet ..................... F04C 2/18 |
| 2020/0088291 A1* | 3/2020 | Payne .................. F16H 57/082 |
| 2021/0048023 A1 | 2/2021 | Crawford et al. |
| 2021/0310372 A1 | 10/2021 | Berger et al. |

FOREIGN PATENT DOCUMENTS

| | | |
|---|---|---|
| EP | 3364034 A1 | 8/2018 |
| EP | 3597918 A1 | 1/2020 |
| EP | 3587846 B1 | 4/2021 |
| EP | 3978753 A1 | 4/2022 |
| GB | 2576087 A | 2/2020 |

OTHER PUBLICATIONS

Extended European Search Report for EP Application No. 23212396.8, Dated Apr. 24, 2024, pp. 10.

\* cited by examiner

CAVITATION RESISTANT JOURNAL BEARING

BACKGROUND

This application is directed to journal bearings, and more particularly, to journal bearings for use with a gear driven pump.

A gear driven pump uses rotating gears to pump fluid from an inlet to an outlet. In use, a rotating drive gear turns a driven gear to drive a fluid into and through the pump. The drive gear and driven gear and their respective gear shafts interface with journal bearings through a hydrodynamic fluid film disposed between a load surface of each gear shaft and a bearing surface of each journal bearing. Such bearings are known as hydrodynamic bearings. As the gears rotate to pump fluid, the gear shafts exert a friction force onto the journal bearings. The friction force creates heat and increases the temperature in the bearings, which in turn increases the chances of fuel cavitation and galling on a face plate of each journal bearing. The temperature increase reduces the lubricant viscosity and the bearing's pressure-velocity (PV) limit. Further, the temperature increase reduces the margin between the pump operating temperature and the vapor temperature of the pumped fluid, which can increase cavitation damage to of surfaces of the journal bearings and gear teeth. Cavitation is the result of a sudden drop in fluid pressure during operation, which causes dissolved gas bubbles to collapse and implode on a surface with forces up to 1000 MPa. Cavitation can cause pitting and/or material loss on surfaces of the journal bearings and gear teeth. Damage from cavitation may eventually result in degraded volumetric pump capacity and even premature pump failure due to the forces exerted on the bearings and gear teeth.

SUMMARY

According to one aspect of the disclosure a gear driven pump includes a first gear having a plurality of gear teeth supported for rotation on a gear shaft relative to a second gear. The gear driven pump also includes a journal bearing for carrying a gear shaft load through a hydrodynamic fluid film between a load surface of the gear shaft and a bearing surface of the journal bearing. The journal bearing includes a bearing body having a bearing body circular opening that forms the bearing surface along a length of the bearing body and face plate adjacent to the bearing surface. The face plate is configured to interface with the first gear. The bearing body circular opening and bearing surface are sized to receive the gear shaft and to form a hydrodynamic fluid film between load surface and bearing surface when the gear driven pump is in operation. The face plate includes a face plate circular opening sized to permit the gear shaft to be received by the bearing body circular opening and bearing surface. The bearing surface is formed from a lubricating bearing material and the face plate is formed from a cavitation resistant base material.

According to another or alternative aspect of the disclosure a journal bearing for a gear driven pump includes a bearing body having a bearing body circular opening that defines a bearing surface along a length of the bearing body and a face plate adjacent to the bearing surface. The bearing surface is configured to carry a gear shaft load through a hydrodynamic fluid film pressure between a load surface of a gear shaft and the bearing surface. The bearing body circular opening and bearing surface are sized to receive the gear shaft and to form a hydrodynamic fluid film between load surface and bearing surface when the gear driven pump is in operation. The face plate is configured to interface with a gear on the gear shaft. The face plate includes a face plate circular opening sized to permit the gear shaft to be received by the bearing body circular opening and bearing surface. The bearing surface is formed from a leaded bronze material and the face plate is formed from a copper-nickel alloy.

According to another or alternative aspect of the disclosure a method of making a journal bearing for a gear driven pump includes forming a bearing body having a bearing body circular opening that defines a bearing surface along a length of the bearing body. The bearing surface is configured to carry a gear shaft load through a hydrodynamic fluid film pressure between a load surface of a gear shaft and the bearing surface. The bearing body circular opening and bearing surface are sized to receive the gear shaft and to form a hydrodynamic fluid film between load surface and bearing surface when the gear driven pump is in operation. The method further includes forming a face plate adjacent to the bearing surface. The face plate is configured to interface with a gear on the gear shaft and includes a face plate circular opening sized to permit the gear shaft to be received by the bearing body circular opening and bearing surface. The bearing surface is formed from a leaded bronze material and the face plate is formed from a copper-nickel alloy.

DETAILED DESCRIPTION

Figure 1:
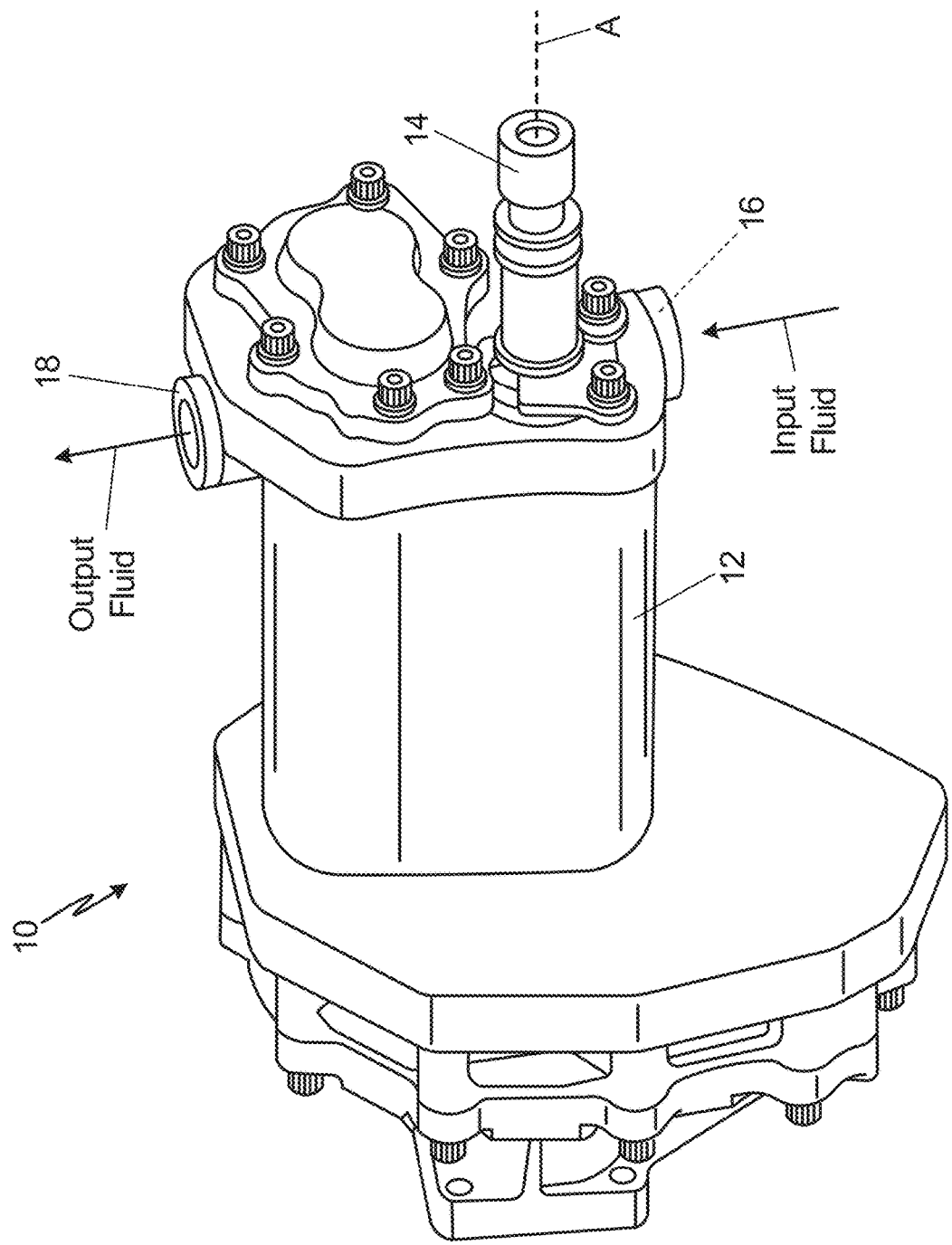
FIG. 1 is a perspective view of an exemplary gear driven fuel pump for an aircraft gas turbine engine.

To illustrate one environment in which the disclosed journal bearings are used, FIG. 1 shows a gear driven fuel pump 10 configured for use in an aircraft gas turbine engine, such as an aircraft main engine or auxiliary power unit. A person of ordinary skill will recognize that this illustration in non-limiting in that the journal bearings of the present disclosure are useful in any high pressure-velocity (PV) bearing environment.

Gear driven fuel pump 10 includes an exterior housing 12 that receives an input shaft 14 and defines a fluid inlet 16 and a fluid outlet 18. Input shaft 14 drives an intermeshed pair of gears (see FIG. 2) disposed within exterior housing 12, such that fluid entering fluid inlet 16 is pressurized and provided at the fluid outlet 18.

Figure 2:
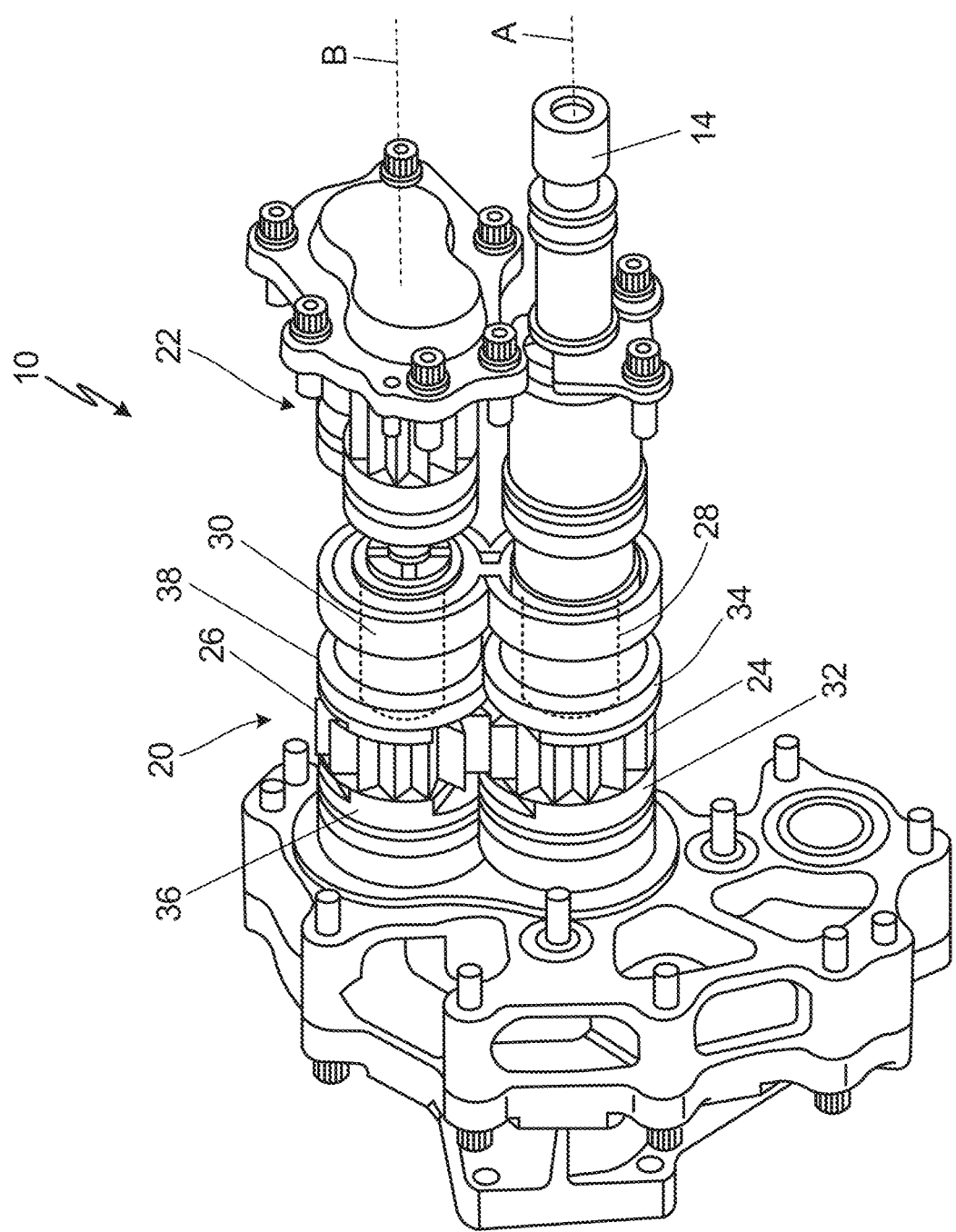
FIG. 2 is a perspective view of the gear driven fuel pump of FIG. 1 with the housing removed.

FIG. 2 shows the interior of gear driven fuel pump 10 with exterior housing 12 removed. Gear driven fuel pump 10 includes first stage 20 and second stage 22, which are serially arranged in relation to one another along rotation axis A and rotation axis B, respectively. First stage 20 includes first gear 24 and second gear 26. First gear shaft 28 supports first gear 24 for rotation on about rotation axis A. Second gear shaft 30 supports second gear 26 for rotation on about rotation axis B. First gear 24 and second gear 26 are rotatably supported in parallel such that the teeth of first gear 24 are intermeshed with teeth of second gear 26. A first set of journal bearings 32 and 34 carriers the load of first gear shaft 28. A second set of journal bearings 36 and 38 carries the load of second gear shaft 30.

Input shaft 14 is mechanically coupled to first gear shaft 28 for rotating second gear shaft 30. Rotation of first gear shaft 28 rotates first gear 24 (i.e., the driven gear). As first gear 24 rotates, the teeth of first gear 24 intermesh and rotate with the teeth of second gear 26. This action pumps fluid disposed between the teeth of second gear 26 so that the fluid is subsequently provided at the fluid outlet 18 of the gear driven fuel pump 10.

Figure 3:
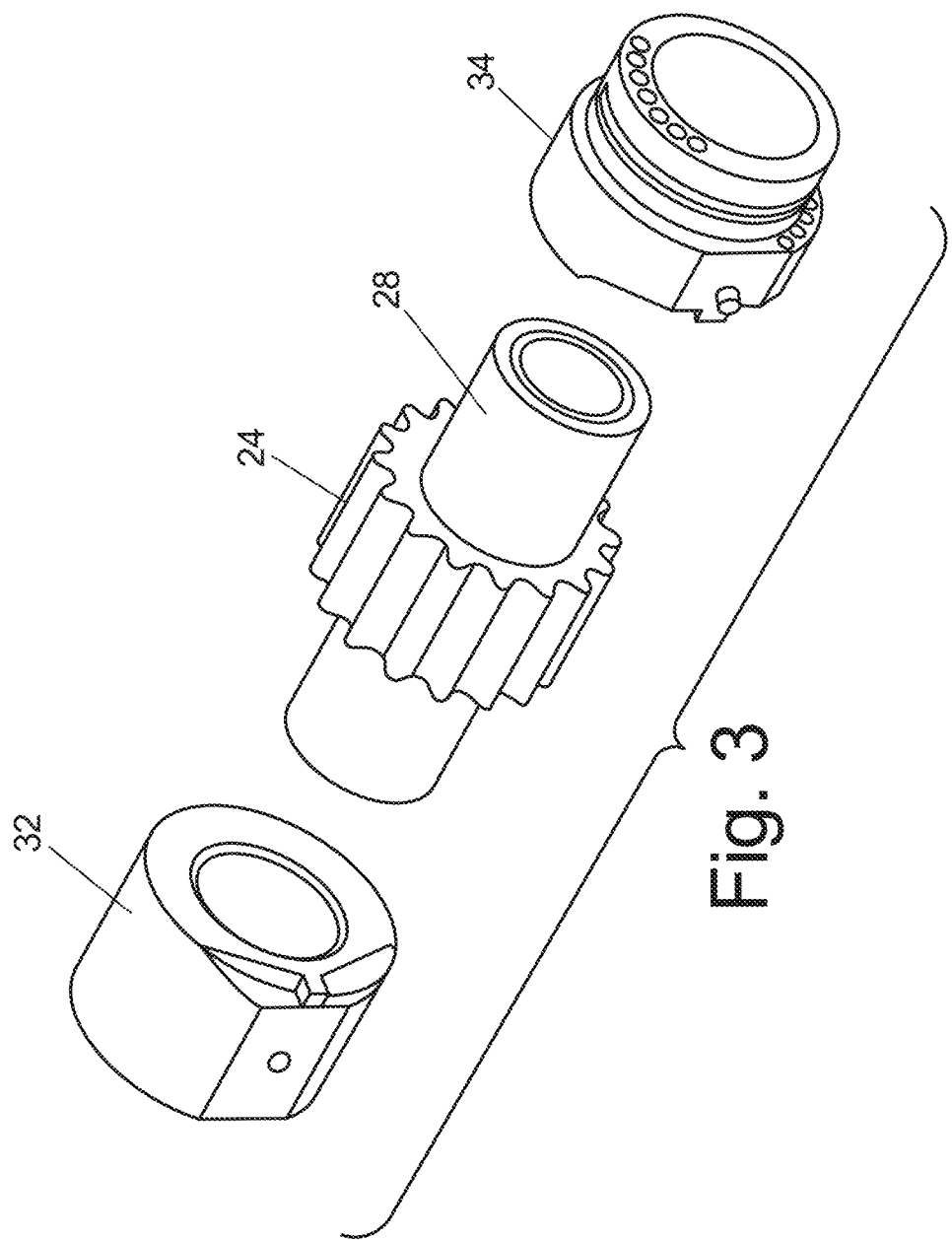
FIG. 3 is an exploded perspective of a drive gear and bearing set from the gear driven fuel pump of FIG. 2.

FIG. 3 shows an exemplary configuration of first gear 24 on first gear shaft 28 with the first set of journal bearings 32 and 34. First gear shaft 28 includes load surface 29a which is configured to slidably engage with journal bearing 32 when the gear shaft 28 and bearing 32 are assembled as shown in FIG. 2. First gear shaft 28 also includes load surface 29b which is configured to slidably engage with journal bearing 34 when the gear shaft 28 and bearing 34 are assembled as shown in FIG. 2. Second gear 26, second gear shaft 30, and the second set of journal bearings 36 and 38 are similarly configured but are not shown.

Figure 4:
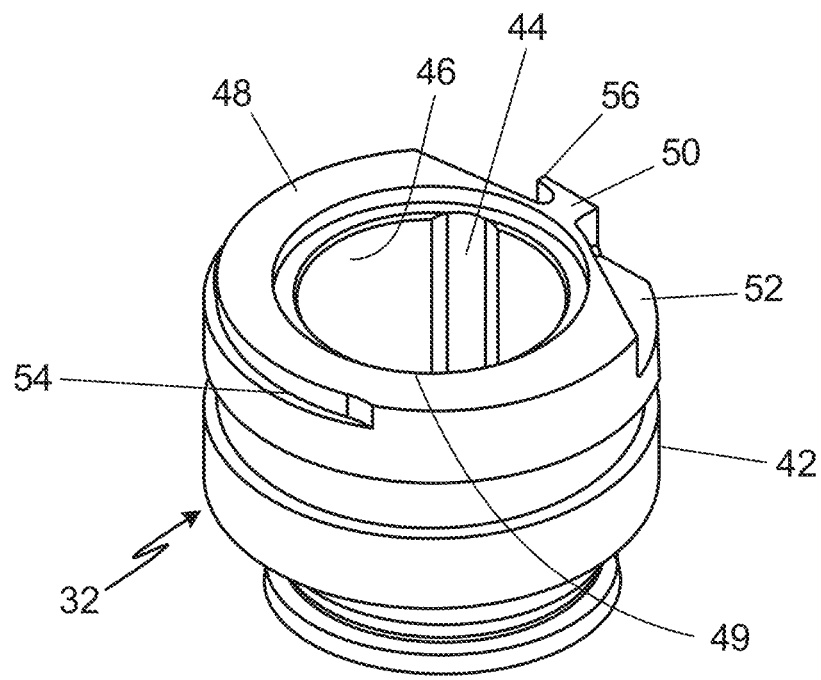
FIG. 4 is a perspective view of one of the journal bearings of FIG. 3.

FIG. 4 is a perspective view of one bearing 32 of the first set of journal bearings 32 and 34. Journal bearing 32 includes a bearing body 42 having a bearing body circular opening 44 that forms a cylindrical shaped bearing surface 46 along a length of bearing body 42. The bearing body circular opening 44 and bearing surface 46 are sized to received gear shaft 28 and to form a hydrodynamic fluid film between load surface 29a of gear shaft 28 and bearing surface 46 when the gear driven fuel pump 10 is in operation. Bearing body 42 can be formed as a single, unitary piece made from a single material. Alternately, bearing body 42 can be formed from more than one material—for example with a bearing surface 46 made from a lubricating bearing material such leaded bronze (e.g. 30% leaded bronze) and portions of the bearing body 42 other than the bearing surface 46 are made from a structural bearing material such as an aluminum or titanium alloy. Such a configuration could result in a lighter weight journal bearing compared one made entirely from a lubricating bearing material such leaded bronze.

Bearing surface 46 is sized to accommodate first gear shaft 28 when the gear shaft 28 and bearing 32 are assembled as shown in FIG. 2. When the gear shaft 28 and bearing 32 are assembled as shown in FIG. 2 and gear driven fuel pump 10 is in operation, a hydrodynamic fluid film forms between load surface 29a of gear shaft 28 and bearing surface 46 of journal bearing 32 to carrying a gear shaft load on gear shaft 28 that is created by operation of gear driven fuel pump 10.

Bearing 32 further includes face plate 48 adjacent to bearing body circular opening 44 and bearing surface 46. Face plate 48 includes a face plate circular opening 49 of the same size or larger size as bearing body circular opening 44 such that face plate 48 has a generally circular shape. The face plate circular opening 49 is sized to permit gear shaft 28 to be received by the bearing body circular opening 44 and bearing surface 46. When the gear shaft 28 and bearing 32 are assembled as shown in FIG. 2 and gear driven fuel pump 10 is in operation face plate 48 faces first gear 24. Face plate 48 includes bridge 50 (which can also be described as a "bridge land," "face cut," "pin," or "hook") that separates fluid inlet channel 52 from fluid outlet channel 54. As first gear 24 rotates in operation, fluid is drawn from inlet channel 52 at a first pressure and into outlet channel 54 at a second pressure, where the second pressure is higher than the first pressure. In the example shown in FIG. 4, face plate 48 is formed as an integral part of bearing body 42 and bearing surface 46 is a separate piece attached to bearing body 42 by means know in the art. In another example, face plate 48 could be formed as a separate component from the remainder of bearing body 42 and could be attached to bearing body 42 adjacent to bearing surface 46 by means know in the art (See FIG. 5 which shows face plate 48 formed from a different material than bearing surface 46 and bearing body 42 as further discussed below). A person of ordinary skill will recognize that other configurations are also feasible.

Cavitation can occur when the local fluid pressure, such as the pressure at face plate 48, falls below the vapor pressure of the pumped fluid, allowing fluid bubbles to form and vigorously collapse back into solution. When cavitation occurs on or near a solid surface, such as face plate 48, cavitation can cause high surface stresses and lead to local deterioration of a bearing surface, such as face plate 48, potentially damaging the surface through pitting and/or erosion-caused material loss. With regard to exemplary journal bearing 32 as shown in FIG. 4, cumulative pitting can erode the surface contours of the bridge 50 that separates the inlet channel 52 from the outlet channel 54, especially in recessed area 56 of outlet channel 54 adjacent to bridge 50. This erosion can have an adverse impact on fluid handling, diminishing the overall performance of the gear driven fuel pump 10.

Previously, journal bearings for gear driven pumps have been made from lubricating bearing materials. Exemplary lubricating bearing materials include leaded bronze alloys (e.g. 30% leaded bronze) and similarly soft bronze alloys, which are available from a number of providers to a variety of specifications. Leaded bronze is a material that tends to prevent galling and seizing, but it is relatively soft and therefore susceptible to cavitation induced pitting, particularly at the face plate 48 of bearing 32 shown in FIG. 4.

We propose making face plate 48 from a cavitation resistant base material. One such cavitation resistant base material is a copper-nickel alloy. For example, a nominal Cu-15 Ni-8 Sn alloy is useful as a cavitation resistant base material. We found that a particular copper-nickel alloy known by the designation C72900, which is available form a number of providers, is well suited to use in journal bearings for gear driven pumps. Table 1 shows the chemical composition of C72900 copper-nickel alloy.

TABLE 1

Chemical Composition of C72900 Copper-Nickel alloy

| Element | Minimum Content (weight %) | Maximum Content (weight %) |
|---|---|---|
| Nickel, Ni [4] | 14.5 | 15.5 |
| Tin, Sn | 7.5 | 8.5 |
| Iron, Fe | 0 | 0.50 |
| Zinc, Zn | 0 | 0.50 |
| Manganese, Mn | 0 | 0.30 |
| Magnesium, Mg | 0 | 0.15 |
| Niobium, Nb | 0 | 0.10 |
| Lead, Pb [3] | 0 | 0.02 |
| Copper, Cu [1, 2] | Balance | Balance |

Figure 6:
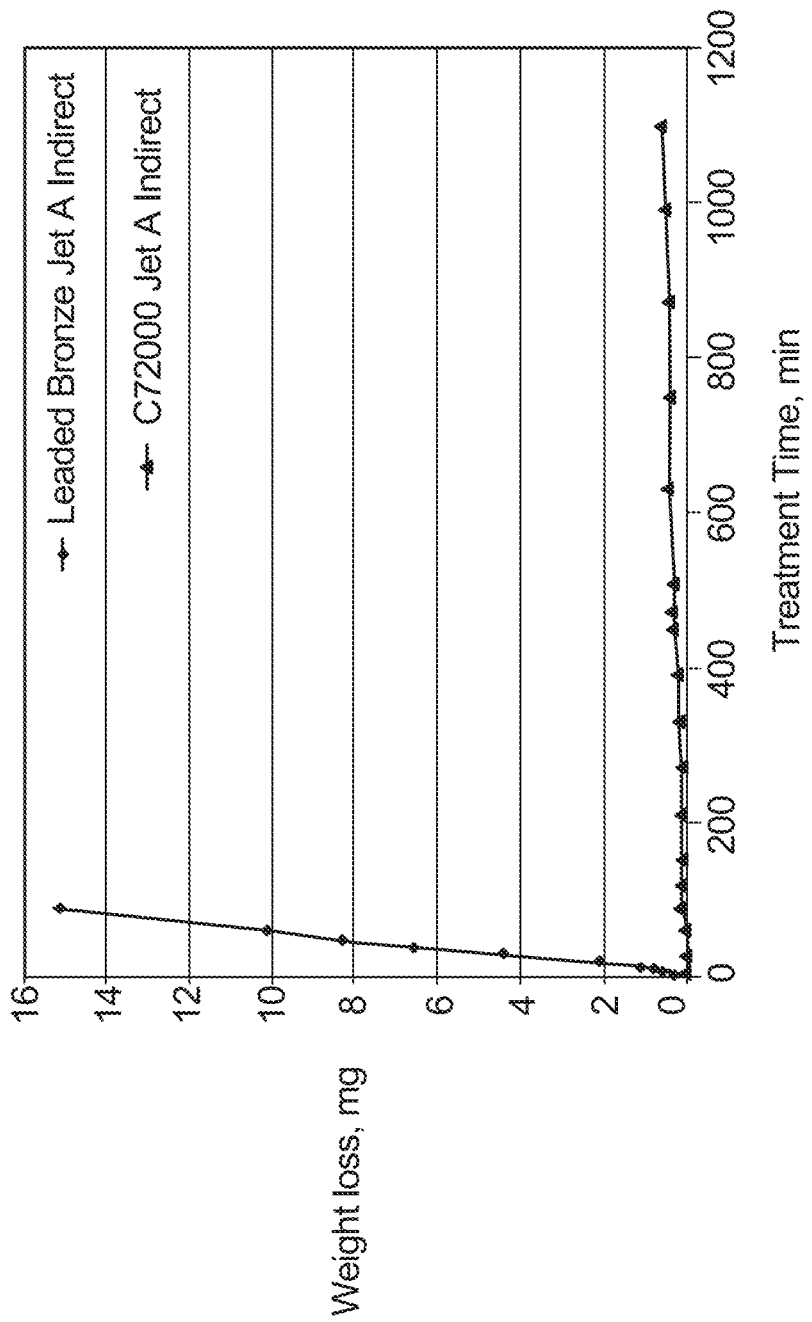
FIG. 6 is a graph showing comparative data illustrating relative amounts of material weight loss for different bearing substrate materials tested in accordance with ASTM G32.

[1] Cu + sum of named elements = 99.7% minimum
[2] Cu value includes Ag
[3] 0.005% Pb maximum for hot rolling
[4] Ni value includes Co FIG. 6 shows comparative data illustrating relative amounts of material weight loss over a period of time for different two bearing substrate materials tested in accordance with ASTM G32 Standard Test Method for Cavitation Erosion Using Vibratory Apparatus. In particular, FIG. 6 compares the current baseline material for journal bearings for gear driven pumps, which is a 30% leaded bronze alloy, with C72900 copper-nickel alloy, both in contact with Jet A fuel. FIG. 6 shows that C72900 copper-nickel alloy exhibits a rate of material loss that is 1%-2% that of the 30% leaded bronze baseline material based on the ASTM G32 test.

Figure 7:
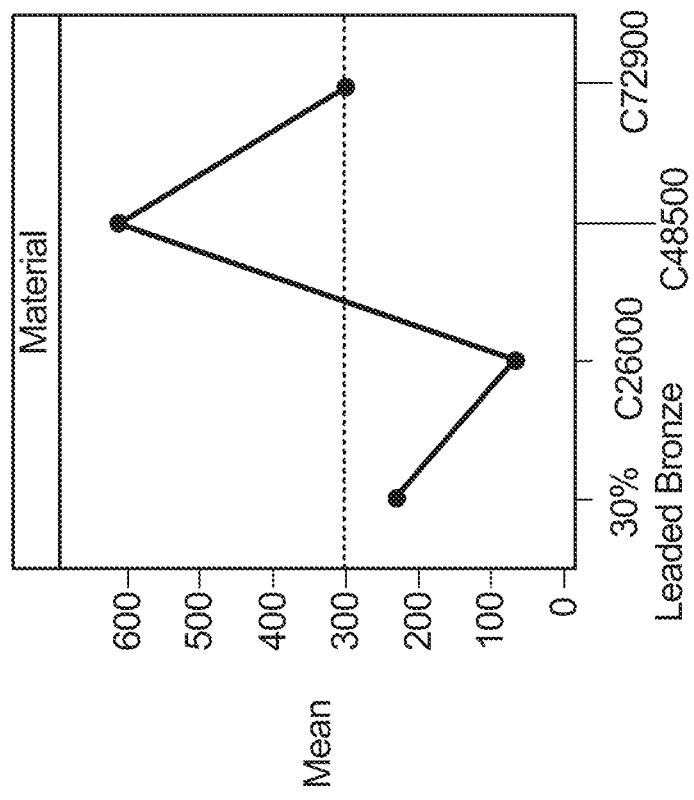
FIG. 7 is a graph showing comparative data illustrating PV limits for different bearing substrate materials tested in accordance with ASTM D3702-94.

FIG. 7 shows comparative data illustrating pressure-velocity (PV) limits for candidate bearing substrate materials tested in conjunction with CPM 10V® steel (Registered Trademark of Crucible Industries LLC of Solvay, New York) in accordance with ASTM D3702-94 Standard Test Method for Wear Rate and Coefficient of Friction of Materials in Self-Lubricated Rubbing Contact Using a Thrust Washer Testing Machine. The tested bearing substrate materials were: 30% leaded bronze alloy, C26000 copper-zinc alloy (also known as "cartridge brass"), C48500 copper-zinc-lead alloy (also known as "high leaded naval brass"), and C72900 copper-nickel alloy. FIG. 7 shows that the C72900 copper-nickel alloy had an average load at failure of 300 lbs compared with an average load at failure of ~250 lbs for the leaded bronze material based on the ASTM D3702-94 test.

Together, the data depicted in FIGS. 6 and 7 show that C72900 copper-nickel alloy has superior cavitation resistance compared with the leaded bronze baseline material. Accordingly, the disclosed face plate 48 of bearing 32 is fabricated from C72900 copper-nickel alloy instead of the leaded bronze material that has been used in the past.

During operation of gear driven fuel pump 10 there can be bearing touchdowns between load surface 29a of gear shaft 28 and bearing surface 46 of journal bearing 32. As a result, it is desirable to retain a lubricating bearing material, such as a leaded bronze alloy (e.g., 30% leaded bronze), for the bearing surface 46 of journal bearing 32 because the lead in leaded bronze acts as a lubricant to reduce friction and galling. Once such suitable material is C94310 leaded bronze alloy. Therefore, the disclosed cavitation resistant journal bearing 32 combines a leaded bronze bearing surface 46 along the gear shaft 28 and a C72900 copper-nickel alloy face plate 48 at the face of gear 24.

Figure 5:
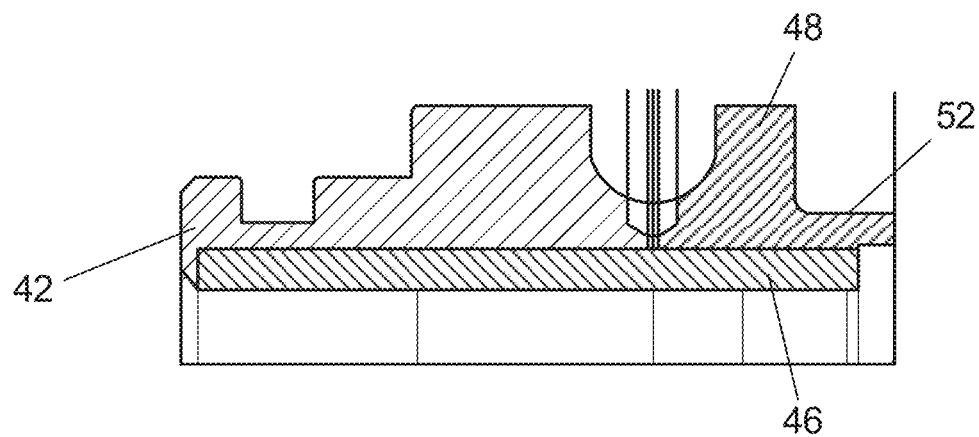
FIG. 5 is a cross section of the journal bearing of FIG. 4.

FIG. 5 is a cross section of journal bearing 32 of FIG. 4 that shows face plate 48 formed from a cavitation resistant base material, including the bridge 50 that separates the inlet channel 52 from the outlet channel 54, especially in recessed area 56 of outlet channel 54 adjacent to bridge 50. At least bearing surface 46 of journal bearing 32, which are not typically subjected to cavitation induced pitting or material loss, is formed from a lubricating bearing material. As discussed above, the remaining portions of the bearing body 42 may be formed of a lubricating bearing material or a structural bearing material as deemed appropriate for a particular application.

Discussion of Possible Embodiments

The following are non-exclusive descriptions of possible embodiments of the present invention.

A gear driven pump includes a first gear having a plurality of gear teeth supported for rotation on a gear shaft relative to a second gear. The gear driven pump also includes a journal bearing for carrying a gear shaft load through a hydrodynamic fluid film between a load surface of the gear shaft and a bearing surface of the journal bearing. The journal bearing includes a bearing body having a bearing body circular opening that forms the bearing surface along a length of the bearing body and face plate adjacent to the bearing surface. The face plate is configured to interface with the first gear. The bearing body circular opening and bearing surface are sized to receive the gear shaft and to form a hydrodynamic fluid film between load surface and bearing surface when the gear driven pump is in operation. The face plate includes a face plate circular opening sized to permit the gear shaft to be received by the bearing body circular opening and bearing surface. The bearing surface is formed from a lubricating bearing material and the face plate is formed from a cavitation resistant base material.

The gear driven pump of the preceding paragraph can optionally include, additionally and/or alternatively, any one or more of the following features, configurations and/or additional components:

A further embodiment of the foregoing gear driven pump, wherein the face plate includes a bridge that separates a fluid inlet channel from a fluid outlet channel, where the face plate is configured such that in operation a fluid is drawn from the inlet channel at a first pressure and into the outlet channel at a second pressure, where the second pressure is higher than the first pressure and the face plate is formed as a separate component from the bearing body.

A further embodiment of any of the foregoing gear driven pumps, wherein the cavitation resistant base material is a copper-nickel alloy and the lubricating bearing material is a leaded bronze alloy.

A further embodiment of the foregoing gear driven pump, wherein the copper-nickel alloy is a nominal Cu-15 Ni-8 Sn alloy.

A further embodiment of any of the foregoing gear driven pumps, wherein portions of the bearing body other than the bearing surface are made from a structural bearing material.

A further embodiment of the foregoing gear driven pump, wherein the structural bearing material is an aluminum or titanium alloy.

A journal bearing for a gear driven pump includes a bearing body having a bearing body circular opening that defines a bearing surface along a length of the bearing body and a face plate adjacent to the bearing surface. The bearing surface is configured to carry a gear shaft load through a hydrodynamic fluid film pressure between a load surface of a gear shaft and the bearing surface. The bearing body circular opening and bearing surface are sized to receive the gear shaft and to form a hydrodynamic fluid film between load surface and bearing surface when the gear driven pump is in operation. The face plate is configured to interface with a gear on the gear shaft. The face plate includes a face plate circular opening sized to permit the gear shaft to be received by the bearing body circular opening and bearing surface. The bearing surface is formed from a leaded bronze material and the face plate is formed from a copper-nickel alloy.

The journal bearing of the preceding paragraph can optionally include, additionally and/or alternatively, any one or more of the following features, configurations and/or additional components:

A further embodiment of the foregoing journal bearing, wherein the face plate includes a bridge that separates a fluid inlet channel from a fluid outlet channel. The face plate is configured such that in operation a fluid is drawn from the inlet channel at a first pressure and into the outlet channel at a second pressure. The second pressure is higher than the first pressure. The face plate is formed as a separate component from the bearing body.

A further embodiment of the foregoing journal bearing, wherein the copper-nickel alloy is a nominal Cu-15 Ni-8 Sn alloy.

A further embodiment of any of the foregoing journal bearing, wherein portions of the bearing body other than the bearing surface are made from a structural bearing material.

A further embodiment of the foregoing journal bearing, wherein the structural bearing material is an aluminum or titanium alloy.

A method of making a journal bearing for a gear driven pump includes forming a bearing body having a bearing body circular opening that defines a bearing surface along a length of the bearing body. The bearing surface is configured to carry a gear shaft load through a hydrodynamic fluid film pressure between a load surface of a gear shaft and the bearing surface. The bearing body circular opening and bearing surface are sized to receive the gear shaft and to form a hydrodynamic fluid film between load surface and bearing surface when the gear driven pump is in operation. The method further includes forming a face plate adjacent to the bearing surface. The face plate is configured to interface with a gear on the gear shaft and includes a face plate circular opening sized to permit the gear shaft to be received by the bearing body circular opening and bearing surface. The bearing surface is formed from a leaded bronze material and the face plate is formed from a copper-nickel alloy.

The method of the preceding paragraph can optionally include, additionally and/or alternatively, any one or more of the following features, configurations and/or additional components:

A further embodiment of the foregoing method, wherein the face plate includes a bridge that separates a fluid inlet channel from a fluid outlet channel. The face plate is configured such that in operation a fluid is drawn from the inlet channel at a first pressure and into the outlet channel at a second pressure. The second pressure is higher than the first pressure. The face plate is formed as a separate component from the bearing body.

A further embodiment of the foregoing method, wherein the copper-nickel alloy is a nominal Cu-15 Ni-8 Sn alloy.

A further embodiment of any of the foregoing method, wherein portions of the bearing body other than the bearing surface are made from a structural bearing material.

A further embodiment of the foregoing method, wherein the structural bearing material is an aluminum or titanium alloy.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A gear driven pump, comprising:
   a first gear having a plurality of gear teeth supported for rotation on a gear shaft relative to a second gear; and
   a journal bearing for carrying a gear shaft load through a hydrodynamic fluid film between a load surface of the gear shaft and a bearing surface of the journal bearing, wherein the journal bearing comprises:
   a bearing body having a bearing body circular opening that forms the bearing surface along a length of the bearing body, wherein the bearing body circular opening and bearing surface are sized to receive the gear shaft and to form a hydrodynamic fluid film between load surface and bearing surface when the gear driven pump is in operation; and
   a face plate adjacent to the bearing surface and configured to interface with the first gear, wherein the face plate includes a face plate circular opening sized to permit the gear shaft to be received by the bearing body circular opening and bearing surface;
   wherein the face plate is formed from a cavitation resistant base material, the bearing surface is formed from a lubricating bearing material, and portions of the bearing body other than the bearing surface are made from a structural bearing material;
   wherein the cavitation resistant base material is a copper-nickel alloy, the lubricating bearing material is a leaded bronze alloy and the structural bearing material is an aluminum or titanium alloy.

2. The gear driven pump of claim 1, wherein the face plate includes a bridge that separates a fluid inlet channel from a fluid outlet channel, where the face plate is configured such that in operation a fluid is drawn from the inlet channel at a first pressure and into the outlet channel at a second pressure, where the second pressure is higher than the first pressure and the face plate is formed as a separate component from the bearing body.

3. The gear driven pump of claim 1, wherein the copper-nickel alloy is a Cu-15 Ni-8 Sn alloy.

4. The gear driven pump of claim 1, wherein the structural bearing material is an aluminum alloy.

5. The gear driven pump of claim 4, wherein the wherein the copper-nickel alloy is a Cu-15 Ni-8 Sn alloy.

6. The gear driven pump of claim 1, wherein the structural bearing material is a titanium alloy.

7. The gear driven pump of claim 6, wherein the wherein the copper-nickel alloy is a Cu-15 Ni-8 Sn alloy.

8. A journal bearing for a gear driven pump, comprising:
   a bearing body having a bearing body circular opening that defines a bearing surface along a length of the bearing body, wherein:
   the bearing surface is configured to carry a gear shaft load through a hydrodynamic fluid film pressure between a load surface of a gear shaft and the bearing surface,
   the bearing body circular opening and bearing surface are sized to receive the gear shaft and to form a hydrodynamic fluid film between load surface and bearing surface when the gear driven pump is in operation, and
   the bearing surface is formed from a leaded bronze material; and
   a face plate adjacent to the bearing surface and configured to interface with a gear on the gear shaft, wherein:
   the face plate includes a face plate circular opening sized to permit the gear shaft to be received by the bearing body circular opening and bearing surface and
   the face plate is formed from a copper-nickel alloy;
   wherein portions of the bearing body other than the bearing surface are made from a structural bearing material, wherein the structural bearing material is an aluminum or titanium alloy.

9. The journal bearing of claim 8, wherein the face plate includes a bridge that separates a fluid inlet channel from a fluid outlet channel, where the face plate is configured such that in operation a fluid is drawn from the inlet channel at a first pressure and into the outlet channel at a second pressure, where the second pressure is higher than the first pressure and the face plate is formed as a separate component from the bearing body.

10. The journal bearing of claim 8, wherein the copper-nickel alloy is a Cu-15 Ni-8 Sn alloy.

11. The journal bearing of claim 8, wherein the structural bearing material is an aluminum alloy.

12. The journal bearing of claim 11, wherein the wherein the copper-nickel alloy is a Cu-15 Ni-8 Sn alloy.

13. The journal bearing of claim 8, wherein the structural bearing material is a titanium alloy.

14. The journal bearing of claim 13, wherein the wherein the copper-nickel alloy is a Cu-15 Ni-8 Sn alloy.

15. A method of making a journal bearing for a gear driven pump, the method comprising:
    forming a bearing body having a bearing body circular opening that defines a bearing surface along a length of the bearing body, wherein:
        the bearing surface is configured to carry a gear shaft load through a hydrodynamic fluid film pressure between a load surface of a gear shaft and the bearing surface,
        the bearing body circular opening and bearing surface are sized to receive the gear shaft and to form a hydrodynamic fluid film between load surface and bearing surface when the gear driven pump is in operation, and
        the bearing surface is formed from a leaded bronze material; and
    forming a face plate from a copper-nickel alloy, wherein:
        the face plate is adjacent to the bearing surface and is configured to interface with a gear on the gear shaft, and
        the face plate includes a face plate circular opening sized to permit the gear shaft to be received by the bearing body circular opening and bearing surface;
    wherein portions of the bearing body other than the bearing surface are made from a structural bearing material, wherein the structural bearing material is an aluminum or titanium alloy.

16. The method of claim 15, wherein the face plate includes a bridge that separates a fluid inlet channel from a fluid outlet channel, where the face plate is configured such that in operation a fluid is drawn from the inlet channel at a first pressure and into the outlet channel at a second pressure, where the second pressure is higher than the first pressure and the face plate is formed as a separate component from the bearing body.

17. The method of claim 15, wherein the copper-nickel alloy is a Cu-15 Ni-8 Sn alloy.

18. The method of claim 15, wherein the structural bearing material is an aluminum alloy.

19. The method of claim 18, wherein the wherein the copper-nickel alloy is a Cu-15 Ni-8 Sn alloy.

20. The method of claim 15, wherein the structural bearing material is a titanium alloy.

* * * * *